(12) United States Patent
Ingram

(10) Patent No.: US 6,206,247 B1
(45) Date of Patent: Mar. 27, 2001

(54) ROTARY VALVE FOR PARTICULATE MATERIALS

(75) Inventor: Galen S. Ingram, Muncy, PA (US)

(73) Assignee: Young Industries, Inc., Muncy, PA (US)

(*) Notice: Subject to any disclaimer, the term of this patent is extended or adjusted under 35 U.S.C. 154(b) by 0 days.

(21) Appl. No.: 09/543,919

(22) Filed: Apr. 6, 2000

(51) Int. Cl.⁷ ...................................................... G01F 11/00
(52) U.S. Cl. ............................................ 222/368; 414/219
(58) Field of Search ........................... 222/368; 251/304; 414/219

(56) References Cited

U.S. PATENT DOCUMENTS

| | | | |
|---|---|---|---|
| 4,427,135 | * | 1/1984 | MacKay et al. ..................... 222/368 |
| 5,037,014 | * | 8/1991 | Bliss ..................................... 222/368 |
| 5,620,116 | * | 4/1997 | Klunger et al. ..................... 222/368 |

* cited by examiner

Primary Examiner—J. Casimer Jacyna
(74) Attorney, Agent, or Firm—Lalos & Keegan; Michael N. Lau; Peter N. Lalos

(57) ABSTRACT

A rotary valve consisting generally of a housing having a cylindrical chamber provided with radially disposed inlet and outlet passageways; a shaft journaled in the housing extending through and disposed coaxially relative to such chamber; and a rotor mounted on said shaft within such chamber having a first set of circumferentially spaced material receiving pockets communicable with the inlet and outlet passageways for receiving material through the inlet passageway, conveying it through the chamber and discharging it through the outlet passageway, and a second set of circumferentially spaced material receiving pockets communicable with the outlet passageway for discharging material through the outlet passageway; a cylindrical wall of the chamber having a passageway having an inlet communicating with a leading side of the inlet passageway and an outlet communicating with the second set of pockets for guiding material received through the inlet passageway and not received within the first set of pockets, to the second set of pockets.

22 Claims, 4 Drawing Sheets

ROTARY VALVE FOR PARTICULATE MATERIALS

This invention relates to rotary valves and more particularly to rotary valves used as metering devices, feeders and rotary airlocks for dry, free flowing particulate materials of various sizes and shapes.

BACKGROUND OF THE INVENTION

In the handling and processing of dry, free flowing particulate materials such as powder, granules, chips, flakes, cubes and pellets, rotary valves commonly are used in metering and feeding such materials. They normally are used with bins, tanks, mixers, silos, classifiers, dryers, collectors, hoppers, cyclone separators, dust collectors and other equipment for pneumatic systems and process operations in various industries. Such valves typically consist of a housing having a cylindrical chamber provided with a material inlet opening and a material outlet opening, a shaft journaled in the housing and extending through the chamber and a rotor mounted on the shaft adapted to receive product fed through the material inlet opening and discharge such material through the outlet opening. The rotor generally consists of a pair of end walls or shrouds and a plurality of radially disposed, circumferentially spaced vanes cooperating with the end walls thereof to form a plurality of pockets which receive material through the inlet opening, convey the material through the rotor chamber and discharge it through the outlet opening. Such valves typically are installed between material holding vessels and pneumatic conveying systems for metering or otherwise feeding amounts of materials from a vessel into a material conveying line.

In the use of such valves, it has been found that a certain amount of the material being fed through the valve, and particularly materials having large particle sizes, become drawn by the rotors between ends of the rotor vanes and the cylindrical wall of the rotor chamber which results either in the shearing of the material particles or, in more severe cases, a jamming of the rotor thus interfering with the operation of the valves.

Many attempts have been made to redesign the feed arrangements of such valves to eliminate such shearing of the material being processed and/or prevent the jamming of such valves but such designs have not proven to be entirely satisfactory. It thus is the principal object of the present invention to provide a rotary valve of the type described in which the shearing of material particles being processed and the jamming of the rotors of such valves by particles trapped between the rotor vanes and the cylindrical wall of the rotor chamber are avoided.

SUMMARY OF THE INVENTION

The shortcomings of the type of valve as described have been found to be overcome by a rotary valve consisting generally of a housing have a cylindrical chamber provided with radially disposed particulate material inlet and outlet passageways; a shaft journaled in such housing extending through and disposed coaxially relative to the rotor chamber; and a rotor mounted on the shaft within the rotor chamber having a first set of circumferentially spaced material receiving pockets communicable with the inlet and outlet passageways for receiving material through the inlet passageway, conveying the material through the rotor chamber and discharging the material through the outlet passageway, and a second set of circumferentially spaced material receiving pockets communicable with the outlet passageway for discharging particulate material through the outlet passageway. The cylindrical wall of the rotor chamber is provided with a passageway having an inlet communicating with a leading side of the inlet passageway and an outlet communicable with the second set of pockets for guiding material received through the inlet passageway and not received within the first set of pockets, to the second set of pockets. The guide passageway intercommunicating the material inlet passageway and the second set of material receiving pockets includes a wall disposed at an angle relative to a plane disposed perpendicular to the axis of the rotor. In such a configuration, particles of material fed through the material inlet passageway and deposited on material filling the pockets of the first set of pockets and otherwise engaging a leading edge of the inlet passageway and becoming sheared by the outer edges of the vanes of the first set of pockets as they pass across the edge of the leading side of the material inlet passageway in close proximity to the cylindrical wall of the rotor chamber or becoming jammed between the edges of the vanes of the first set of pockets and the cylindrical wall of the rotor chamber, will be caused to be received within the guide passageway and guided toward and into the second set of pockets to be conveyed through the rotor chamber and discharged through the material outlet passageway. Preferably, the material inlet passageway is provided with a baffle having a lower edge spaced from the ends of the vanes defining the first set of material receiving pockets, sufficiently to permit particles of materials fed through the material inlet passageway and not received within the first set of pockets to be fed at a controlled rate into and through the guide passageway to the second set of pockets of the rotor. Such baffle arrangement further assures an even and controlled feed rate of material conveyed through the guide passageway to the second set of pockets of the rotor.

DETAILED DESCRIPTIONS OF THE PREFERRED EMBODIMENTS OF THE INVENTION

Figure 2:
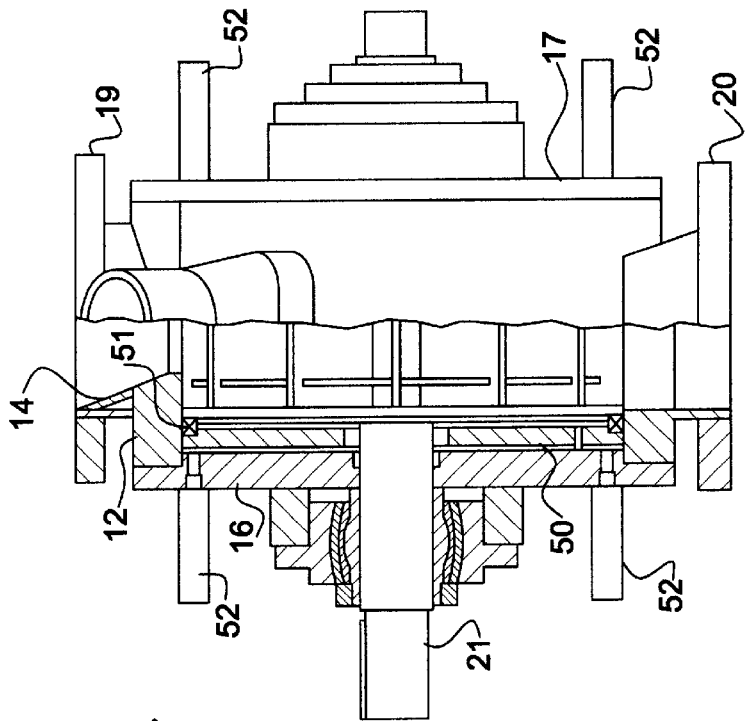
FIG. 2 is a side view of the embodiment shown in FIG. 1, having a portion thereof broken away to expose the material inlet and outlet passageways and the rotor thereof.
Figure 1:
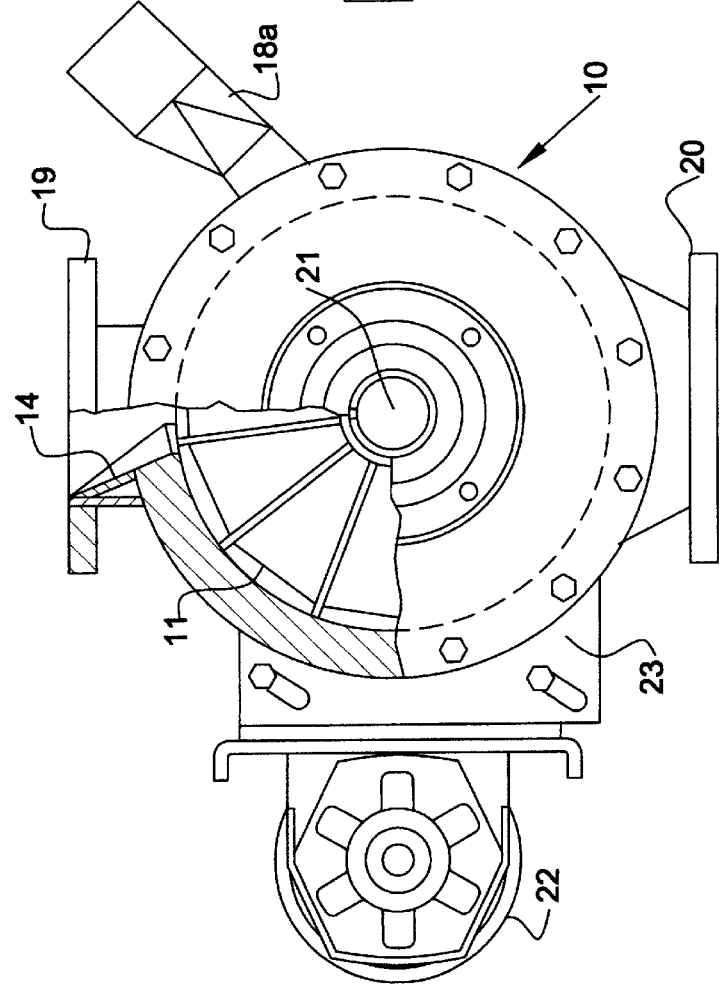
FIG. 1 is an end elevational view of a rotary valve embodying the present invention, having a portion thereof broken away to expose the material inlet passageway and the rotor thereof.
Figure 3:
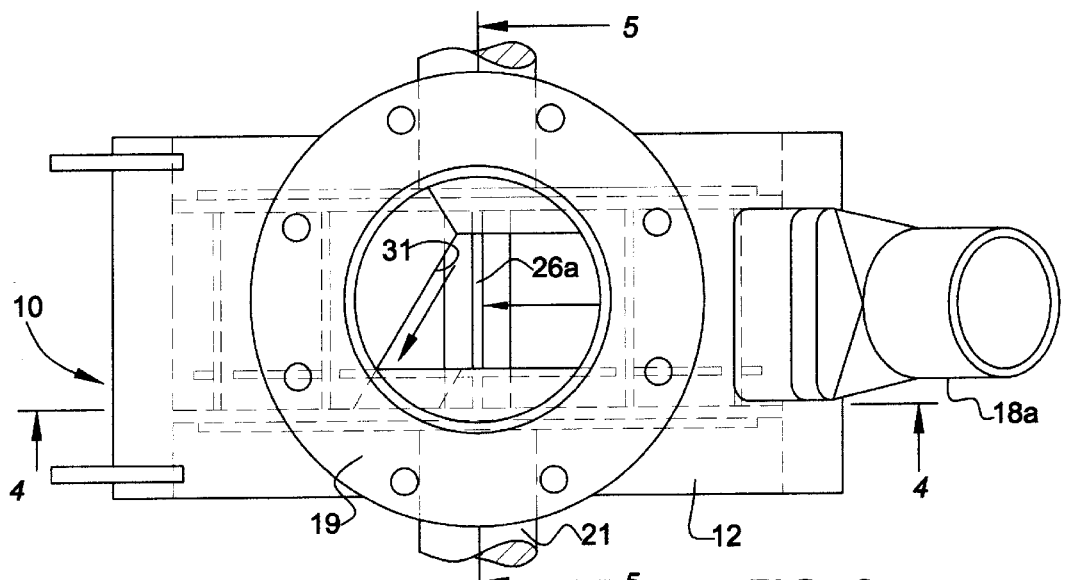
FIG. 3 is an enlarged top view of the embodiment shown in FIGS. 1 and 2.
Figure 4:
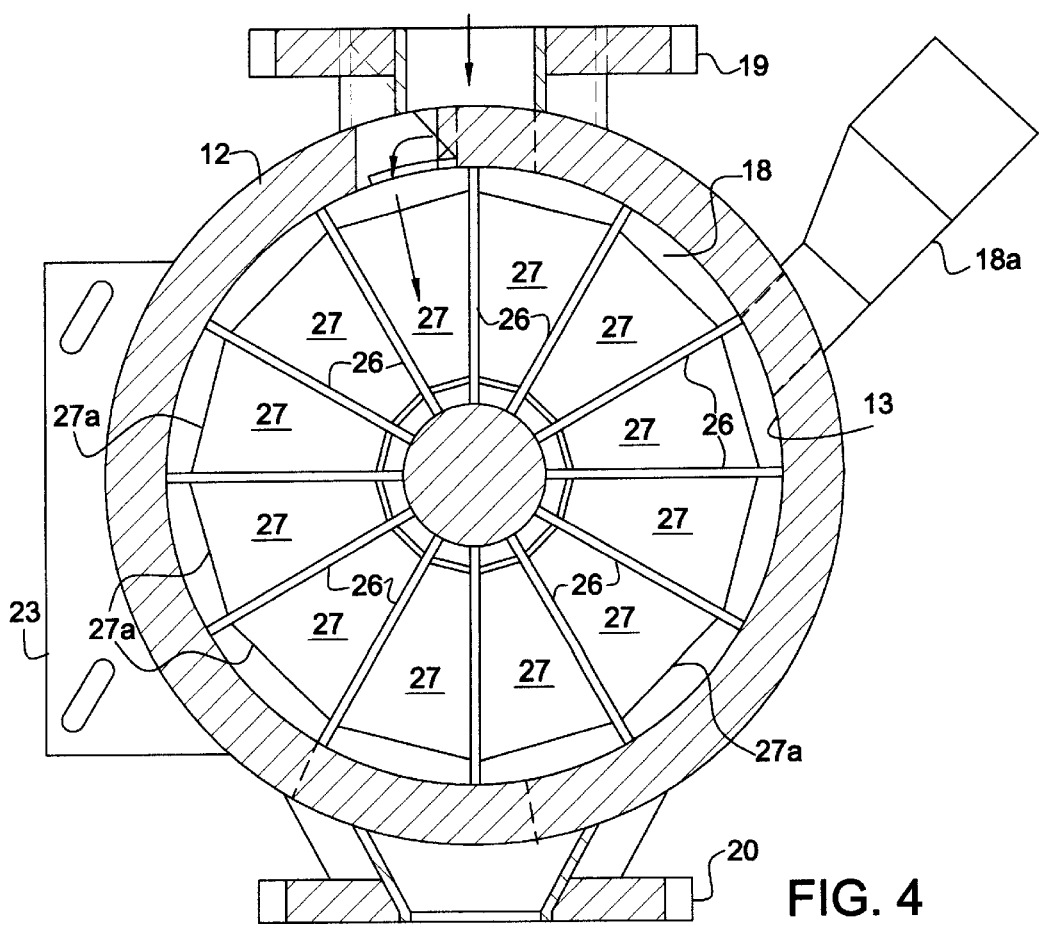
FIG. 4 is a cross sectional view taken along line 4—4 in FIG. 3.

Referring to FIGS. 1 through 5 and 9, there is illustrated a first embodiment of the invention which generally includes a housing 10 and rotor 11. The housing includes an annular member 12 having a inner, annular surface 13 and provided with material inlet and outlet passageways 14 and 15 disposed substantially 180° apart relative to the axis of annular wall 13, and a pair of end plates 16 and 17 bolted to the sides of the annular member to provide a cylindrical rotor chamber 18. As best seen in FIGS. 3 and 4, the rotor chamber is vented by means of a vent 18a mounted on housing member 12 at an annular distance from the material inlet passageway, relative to the axis of the rotor chamber. Mounted on housing member 12 at opposite ends thereof and communicating with the material inlet openings 14 and 15, respectively, are connecting flanges 19 and 20. Flange 19 is adapted to be connected to an overhead vessel and the like for receiving gravity fed material therethrough. Flange 20 is adapted to be connected to a material receiving device such as a pneumatic conveying line for conveying material thereto.

Figure 5:
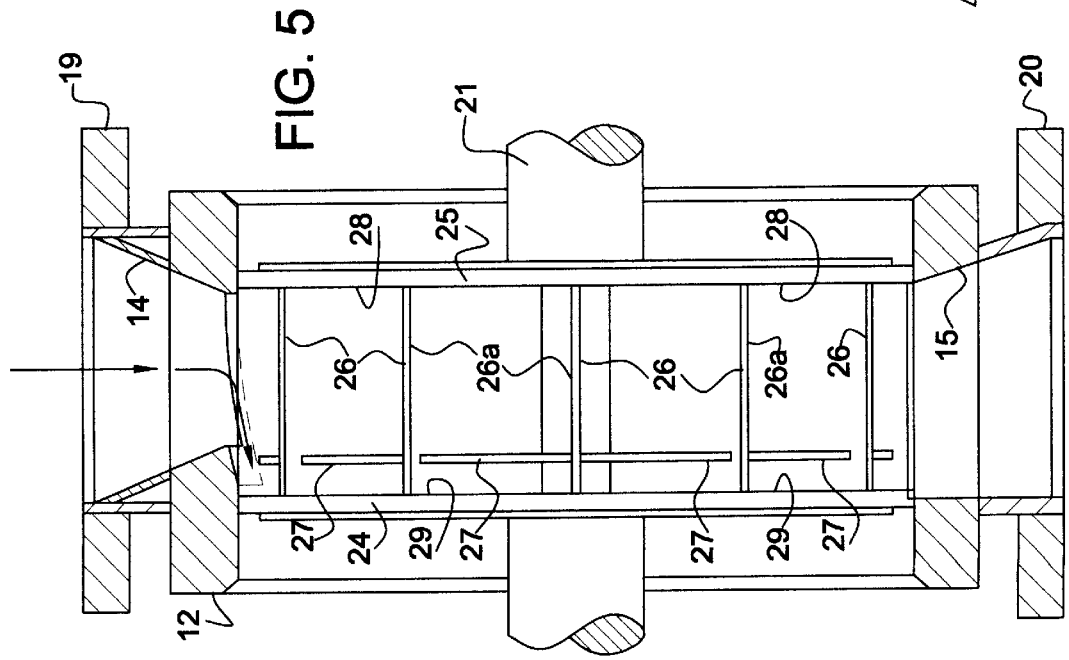
FIG. 5 is a cross sectional view taken along line 5—5 in FIG. 3.

Journaled in housing end plates, 16 and 17 and disposed coaxially relative to the rotor chamber is a rotor support shaft 21. Shaft 21 is adapted to be driven by a motor 22 mounted on a bracket 23 supported on the housing through a suitable gear reduction and a chain or belt drive. Rotor 11 is rigidly mounted on shaft 21 and includes a pair of parallel, axially spaced end walls or shrouds 24 and 25 and a plurality of circumferentially spaced, radially disposed vanes 26, as best seen in FIGS. 4 and 5. Spaced from rotor end walls 24 and 25, adjacent end wall 24 and secured to successive vanes 26 is a set of partition plates 27 which lie substantially in the same plane, spaced from and parallel to rotor end walls 24 and 25. The rotor shaft, the rotor end walls 24 and 25, the radially disposed vanes 26 and partition plates 27 define a first set of circumferentially spaced, material receiving pockets 28 and a second set of circumferentially spaced, material receiving pockets 29. As best shown in FIG. 5, material inlet opening 14 in housing member 12 is in radial alignment with only the set of pockets 28 so that material fed through inlet passageway 14 will be guided only into pockets 28, and outlet passageway 15 is in radial alignment with both sets of pockets 28 and 29 for receiving material from both sets of pockets 28 and 29. Also, as best shown in FIG. 4, the radial dimension of each of vanes 26 is slightly less than the radius of inner housing member wall 13 to permit clearance of the edges of the vanes relative to wall surface 13 for conveying material through the valve yet maintaining a pressure differential across the rotor, and the radial dimension of the outer edge 27a of each partition 27 is less than the radial dimension of each vane so that the outer ends of adjacent pockets 28 and 29 intercommunicate.

Figure 8:
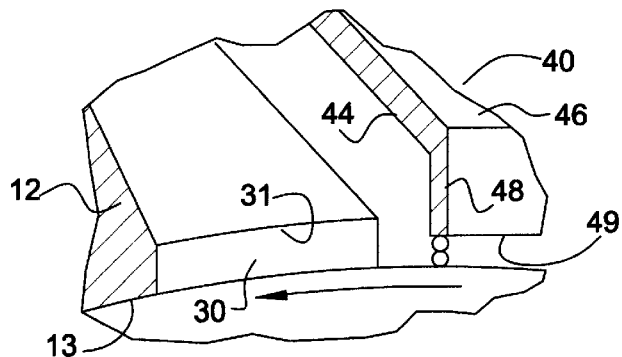
FIG. 8 is an enlarged fragmentary view of the portion of the valve indicated in FIG. 7.
Figure 9:
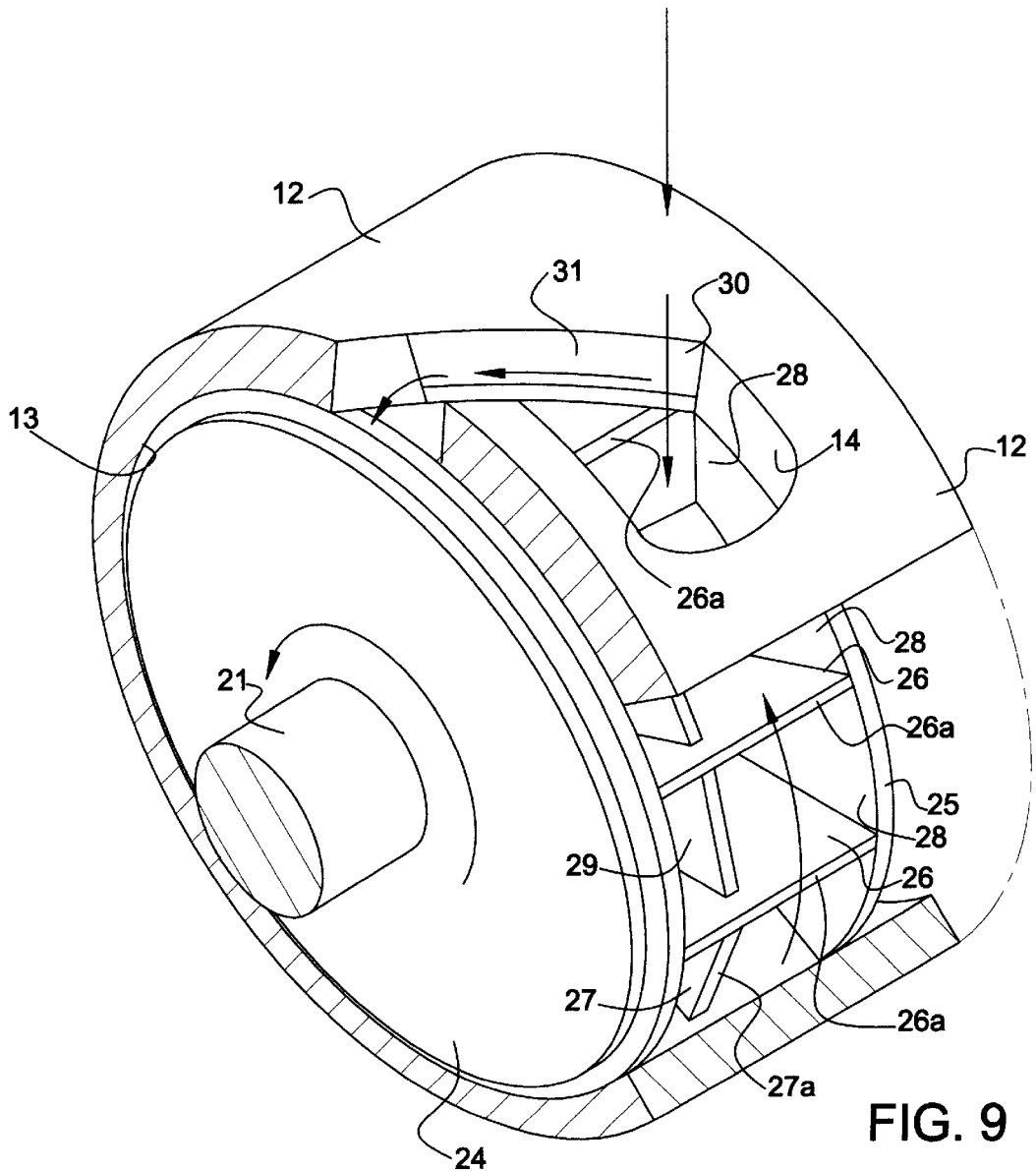
FIG. 9 is a perspective view of the rotor and a portion of the housing of the embodiment shown in FIGS. 1 through 5, having portions of the housing broken away to illustrate the direct communication relationship of the pockets of the first set of pockets of the rotor with the material inlet passageway and the indirect communication relationship of the pockets of the second set of pockets with the material inlet passageway through the guide passageway.

Referring to FIGS. 8 and 9, a material guide passageway 30 is provided in cylindrical surface 13 of housing member 12 which intercommunicates the leading side of material inlet passageway 14 and the space between the planes of rotor end wall 24 and partition plates 27, leading to the second set of pockets 29. Guide passageway 30 is provided with a guide wall 31 which extends arcuately and laterally, at an angle to radially disposed vanes 26 to guide particles of materials fed through inlet passageway 14 and deposited on particles of materials filling pockets 28, circumferentially and laterally into pockets 29, from where they are conveyed through rotor chamber 18 and discharged through material outlet passageway 15. Because such overflow particles are guided in a circumferential and lateral direction into pockets 29, they are prevented from being pinched between vane edges 26a and cylindrical rotor chamber wall 13 to either shear or jam the valve. The bulk of material fed through the inlet passageway will be deposited in pockets 28 and conveyed through the rotor chamber to the outlet passageway. Those particles of material deposited on the particles filling pockets 28, otherwise likely to be pinched between the outer edges of vanes 26 and rotor chamber wall 13, will merely be guided into pockets 29. In this regard, it will be noted that the width or the dimension in the axial direction of material inlet passageway 14 is substantially the same as the width of pocket 28 and such inlet passageway is radially aligned with pockets 28 so that material fed through inlet passageway 14 will only be directly deposited in pockets 28 and not pockets 29 to accommodate the receipt of material through passageway 30 into pockets 29 which otherwise may be pinched between ends of vanes 26 and cylindrical rotor chamber wall 13, with the exception of a small amount of material which may flow from pockets 28 to pockets 29 in the small space between partition edges 27a and cylindrical rotor chamber wall 13.

Figure 6:
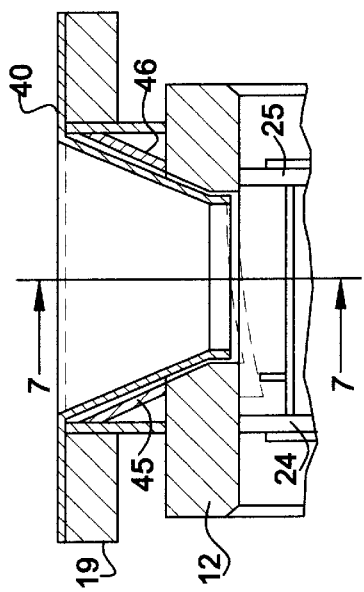
FIG. 6 is an enlarged view of the upper portion of the view shown in FIG. 5, incorporating the use of a baffle in the material inlet passageway.
Figure 7:
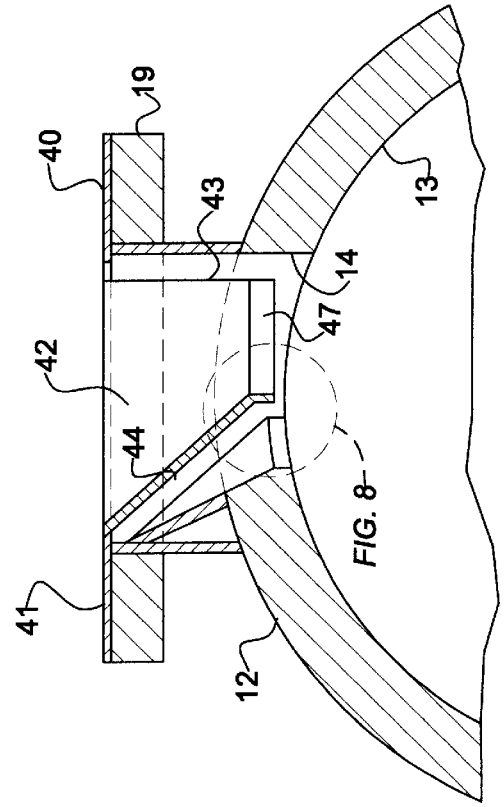
FIG. 7 is a cross sectional view taken along line 7—7 in FIG. 6.

To further assure against the pinching of particles between the ends of the vanes and the cylindrical chamber wall, and further provide for a smooth and uninterrupted flow of material through the valve, a baffle member 40 may be provided on flange 19, projecting into material inlet passageway 14. As best shown in FIGS. 6 through 8, the baffle member includes an annular section 41 adapted to rest on flange 19 and a funnel-shaped section 42 extending from the inner side of the annular flange section into passageway 14. The funnel-shaped section includes a substantially vertical, depending wall 43, a rearwardly-sloped front wall 44 and a pair of converging side walls 45 and 46, which converge together in a rectangular outlet portion 47 having a lower edge spaced a short distance from the annular plane defined by the path of travel of the outer edges of vanes 26 as they rotate. Funnel-shaped section 42 of the baffle is configured so that the front wall segment 48 of lower portion 47 is spaced from, yet adjacent to, passageway 30 and lower edge 49 is spaced from the path of the outer edges of vanes 26 a sufficient distance to allow the passage of the proper amount of material capable of being accommodated by passageway 31 for guiding excess material fed through inlet passageway 14 to pockets 29. The dimensions of guide passageway 31 and the spacing between lower edge 49 of the baffle and the path of the outer ends of vanes 26 may be sized to accommodate materials of different particle sizes.

The rotor may be sealed relative to the housing to maintain a pressure differential across the rotor by means of a sealing arrangement as shown in FIG. 2. The arrangement includes an annular follower plate 50 disposed on each side of the rotor between an end plate of the housing and an end wall of the rotor, an annular sealing gasket 51 mounted in a recess along the inner periphery of each follower plate which is adapted to engage cylindrical rotor chamber wall 13 and a rotor end wall, and a plurality of air actuated cylinders 52 which are operable to displace the follower plates axially toward the rotor and thus urge the sealing gaskets into sealing engagement with cylindrical rotor chamber wall 13 and the outer peripheral portions of the rotor side walls.

In the use of the valve as described, the valve may be operated either with or without a baffle member inserted in the inlet passageway. If a baffle member is to be used, one of a suitable configuration to accommodate a material of a particular particle size and composition is selected and installed in the inlet passageway. With the valve installed to meter or feed a particulate material, motor 22 is energized to rotate the rotor. As material is fed through the inlet passageway, it will deposit within pockets 28 and be conveyed through the valve and discharged through the outlet passageway. Excess material deposited on the material within pockets 28 will be caused to be advanced through guide passageway 30 where it will be diverted by guide wall 31 into pockets 29 which will convey such excess material through the valve and discharge it through the outlet passageway. As previously indicated, the baffle member will control the amount of excess material directed to and through the guide passageway to facilitate the flow of material through the valve. Excess air in the pockets will be vented through vent 18a as the pockets approach the inlet passageway.

The valve as described may be formed of any suitable metal including carbon steel, stainless steel and aluminum. The components will be cast and/or fabricated. To accommodate abrasive or corrosive materials, various lining materials such as Teflon or special alloys may be used. Other materials such as plastic materials also may be used in the manufacture of the valves. In addition, other configurations of connecting flanges may be used to connect the valve to desired feeding and receiving components.

From the foregoing detailed description it will be evident that there are a number of changes, adaptations and modifications of the present invention which come within the province of those persons having ordinary skill in the art to which the aforementioned invention pertains. However, it is intended that all such variations not departing from the spirit of the invention be considered as within the scope thereof as limited solely by the appended claims.

I claim:

1. A rotary valve comprising:
   a housing having a cylindrical chamber provided with radially disposed inlet and outlet passageways;
   a shaft journaled in said housing extending through and disposed coaxially relative to said chamber; and
   a rotor mounted on said shaft within said chamber having a first set of circumferentially spaced material receiving pockets communicable with said inlet and outlet passageways for receiving material through said inlet passageway and discharging said material through said outlet passageway, and a second set of circumferentially spaced material receiving pockets communicable with said outlet passageway for discharging material through said outlet passageway;
   a cylindrical wall of said chamber having a passageway provided with an inlet communicating with a leading side of said inlet passageway and an outlet communicable with said second set of pockets for guiding material received through said inlet passageway and not received within said first set of pockets, to said second set of pockets.

2. A rotary valve according to claim 1 wherein said inlet and outlet passageways are displaced substantially 180° apart.

3. A rotary valve according to claim 1 including a baffle disposed in said inlet passageway, having a lower edge spaced from said rotor sufficiently to permit a controlled amount of particles of material fed through said inlet passageway and not received within said first set of pockets to be advanced into and through said guiding passageway to said second set of pockets of said rotor.

4. A rotary valve according to claim 1 including a funnel-configured member disposed in said inlet passageway, having a lower edge spaced from said rotor sufficiently to permit a controlled amount of particles of material fed through said inlet passageway and not received in said first set of pockets to be advanced into and through said guiding passageway to said second set of pockets.

5. A rotary valve according to claim 4 wherein the lower portion of the lower edge of said funnel-configured member is spaced from said guiding passageway.

6. A rotary valve according to claim 4 wherein a portion of the lower edge of said funnel-configured member extends along the entire width of said inlet passageway.

7. A rotary valve according to claim 1 wherein said guiding passageway includes a wall disposed at an angle relative to a plane including the axis of rotation of said rotor.

8. A rotary valve according to claim 1 wherein said guiding passageway includes a wall extending partially along and across a sector of said rotor.

9. A rotary valve according to claim 1 wherein said rotor has a diameter slightly less than the diameter of the cylindrical wall of said rotor chamber to provide a close fit between said rotor and said housing, precluding the passage of material between said rotor and said cylindrical wall of said rotor chamber.

10. A rotary valve according to claim 1 wherein said rotor includes a pair of circular end walls, a plurality of radially disposed vanes and a plurality of partition plates each spaced from and between said rotor end walls and secured to a pair of angularly spaced vanes, to provide said first and second sets of pockets.

11. A rotary valve according to claim 10 wherein said partition plates lie in a plane and the space between said plane and an end wall of said rotor is aligned with said inlet and outlet passageways.

12. A rotary valve according to claim 10 including a baffle disposed in said inlet passageway, having a lower edge spaced from said rotor sufficiently to permit a controlled amount of particles of material fed through said inlet passageway and not received in said first set of pockets to be advanced into and through said guiding passageway to said second set of pockets of said rotor.

13. A rotary valve according to claim 12 wherein said baffle extends the entire width of said first set of pockets of said rotor.

14. A rotary valve according to claim 10 including a funnel-configured member disposed in said inlet passageway, having a lower edge spaced from said rotor sufficiently to permit a controlled amount of particles of material fed through said inlet passageway and not received in said first set of pockets to be advanced into and through said guiding passageway to said second set of pockets.

15. A rotary valve according to claim 14 wherein a portion of the lower edge of said funnel-configured member is spaced from said guiding passageway.

16. A rotary valve according to claim 14 wherein a portion of the lower edge of said funnel-configured member extends along the entire width of said inlet passageway.

17. A rotary valve according to claim 10 wherein said guiding passageway includes a wall disposed at an angle relative to a plane including the axis of location of said shaft.

18. A rotary valve according to claim 10 wherein said guiding passageway includes a guide wall extending along a portion of the circumference and across the width of said rotor.

19. A rotary valve according to claim 10 wherein the radial dimension of each of said partition plates is less than the radial dimension of each of said vanes, permitting intercommunication between adjacent pockets of said first and second sets of pockets, and lateral flow of a limited amount of particles deposited in said first set of pockets into said second set of pockets.

20. A rotary valve according to claim 1 wherein an inlet of said guiding passageway extends across the entire width of said inlet passageway.

21. A rotary valve according to claim 1 wherein said guiding passageway includes a guide wall engageable by particles fed through said inlet passageway and not received within said first set of pockets, having a substantially spiral contour.

22. A rotary valve according to claim 21 wherein said guiding passageway has a width substantially equal to the width of said inlet passageway.

* * * * *